United States Patent [19]
Payne et al.

[11] Patent Number: 5,455,670
[45] Date of Patent: Oct. 3, 1995

[54] OPTICAL ELECTRONIC DISTANCE MEASURING APPARATUS WITH MOVABLE MIRROR

[75] Inventors: John M. Payne, Tucson, Ariz.; David H. Parker, Arborvale, W. Va.; Richard F. Bradley, Stanardsville, Va.

[73] Assignee: Associated Universities, Inc., Washington, D.C.

[21] Appl. No.: 68,543

[22] Filed: May 27, 1993

[51] Int. Cl.$^6$ .............................. G01C 3/08; G01C 3/00; G01B 11/26; G01B 11/24
[52] U.S. Cl. ..................... 356/5.1; 356/3.11; 356/141.1; 356/152.2; 356/152.3; 356/376; 356/2
[58] Field of Search ........................ 356/1, 4, 5, 141.1, 356/152.2, 152.3, 376, 3.11, 5.1, 2

[56] References Cited

U.S. PATENT DOCUMENTS

| | | | |
|---|---|---|---|
| 3,809,477 | 5/1974 | Russell | 356/5 |
| 4,274,736 | 6/1981 | Balmer | 356/5 |
| 4,457,625 | 7/1984 | Greenleaf et al. | 356/1 |
| 4,560,271 | 12/1985 | Fumio | 356/5 |
| 4,810,088 | 3/1989 | Karning et al. | 250/342 |

OTHER PUBLICATIONS

J. M. Payne; Rev. of Scientific Instr.; vol. 44, #3; Mar. 1973; p. 304.
J. M. Payne et al.; Rev. of Scientific Instr.; vol. 63, #6; Jun. 1992; p. 3311.

Primary Examiner—Stephen C. Buczinski
Attorney, Agent, or Firm—Margaret C. Bogosian

[57] ABSTRACT

A rangefinder system employs three laser rangefinders for determining three dimensional coordinates, each rangefinder using a steerable mirror for aiming the rangefinder beams at a series of retroreflectors. The beams are modulated at 1.5 GHz. The system includes a signal at an offset frequency of 1 kHz for phase detection. A digital phase detector under control of a local computer, as is the mirror, computes phase difference which is used to measure the distances to the retroreflectors. Correction is made for zero point phase drift of the circuit of each rangefinder and a benchmark reference to a distant retroreflector corrects for atmospheric effects on the measurements. A central computer directs the implementation of the tasks of the local computers of each rangefinder and computes and displays trilateration computation results made from the three rangefinders. The system can measure the distance to five different points per second with ranges up to 120 m at all accuracy of about 50 μm.

32 Claims, 14 Drawing Sheets

OPTICAL ELECTRONIC DISTANCE MEASURING APPARATUS WITH MOVABLE MIRROR

This invention was made with government support under Cooperative Agreement No. AST-8814515, between the National Science Foundation and Associated Universities, Inc. The government has certain rights in the invention.

FIELD OF THE INVENTION

This invention relates to electronic distance measuring apparatus, and in particular, to apparatus employing an infrared modulated signal.

BACKGROUND OF THE INVENTION

Electronic distance measuring apparatus are widely used. These apparatuses are wavelength dependant and may use signals of long waves, e.g., 150 m to 2 km wavelength, referred to as hydrographic systems for navigation purposes, microwaves, e.g., 8 mm to 10 cm wave length, and visible light of significantly shorter wavelength, e.g., in the order of about $0.6 \times^{-6}$ m wave lengths. The latter referred to as optical systems often use infrared light waves generated by lasers. More commonly these systems are referred to as laser rangefinders. All of these systems are described in more detail in the literature such as *Electromagnetic Distance Measurement*, C. D. Burnside, 3rd Ed., BSP Professional books, London, 1991 and a book of the same title by J. M. Rueger, 3rd Ed., Springer-Verlag, New York, 1990. These texts include descriptions of apparatuses and detailed explanation of their principles of operation.

As discussed therein, higher accuracies of measurement, e.g., in optical systems operating at sub mm accuracies in atmospheric conditions that tend to vary in a way so as to cause major discrepancies in the resulting measurements. For example, in infrared or near infrared systems to maintain an accuracy better than 1 ppm, temperature needs to be known within +/−1° C. Other factors that affect measurement accuracy include atmospheric turbulence, bulk refractive index of the atmosphere, pressure and humidity. For example, see the article entitled *Rangefinder with Fast Multiple Range Capability*, J. M. Payne et al. Rev. Sci. Instrum. 63 (6), June 1992 for further discussion on this point and which also discloses certain aspects of the invention described herein.

The present inventors are presently involved in the design of a radio telescope as also discussed in the aforementioned article. The telescope has a reflector surface which is a part of a paraboloid, so positioned that radiation can reach the reflector and then pass to one of two focal points without meeting obstructions. This clear aperture collects radiation from a circular area of 100 m diameter. The goal is to provide an instrument which performs well at radio wavelengths as short as 3 min.

To achieve satisfactory performance at short wavelengths, a radio telescope must meet two main requirements:

(1) The reflector surface must maintain its required shape.

(2) The position of the telescope beam on the sky must always be controlled with precision.

These can be thought of as the "surface" and "pointing" requirements; the precision with which they must be met is related to the shortest wavelength at which the telescope is to be used, and both are dependent on atmospheric conditions at the telescope site. As an example, at a wavelength of 3 mm, it would ideally be expected to have a surface whose departures in shape from perfection had rms value of less than 0.2 mm and the astronomer would wish to point the telescope beam to within one arcsecond of any desired point in the sky.

The most significant environmental effects are due to wind and temperature. In the absence of wind, unavoidable temperature variations may result in a short-wavelength limit of ~8 mm for a steel structure of the size of the radio telescope. As the telescope moves in elevation, many parts of the structure deform due to the force of gravity. Although these deformations can to some extent be computed, it is not easy to allow for all their effects.

The present inventors recognize a need for an accurate rangefinder system that may advantageously be used in the radio telescope to deal with the above problems. One use is to measure the shape of the reflector surface. Another use is to assist in pointing the telescope accurately in the sky. However, no known rangefinder system has the accuracy essential for these tasks, e.g., an accuracy to 50 μm over a distance of about 120 meters, including considering the effects of atmospheric conditions and circuit accuracies on the resulting measurements. Further, to measure 2000 points in a radio telescope in a reasonable time frame requires a measuring rate of about 5 measurements per second. No known system can do this.

SUMMARY OF THE PRESENT INVENTION

An electronic optical distance measuring apparatus according to the present invention comprises means for generating a modulated optical signal at a given modulation frequency. Means transmit the optical signal from a reference location to a plurality of targets each of which reflects the received transmitted signal. Means receive the reflected signals at the reference location and detect the received signals wherein the detected signals each have a phase difference with the transmitted signal manifesting the distance between the target corresponding to that detected signal and the reference location. Means determine the phase difference between the detected signals and the transmitted signal and generate a phase difference signal. Means responsive to the phase difference signal are included for determining the distance from the reference location to each of the targets from the determined phase difference.

In accordance with an embodiment of the invention, the means for transmitting includes mirror means for directing the transmitted signal to the plurality of targets.

According to a still further embodiment, the means for determining phase difference includes means for measuring phase difference from a zero point, the zero point tending to exhibit drift causing error in the determined distance, the means for transmitting including means for transmitting the optical signal to a first reference target for generating a reflected reference distance signal and means are included responsive to the reference distance signal applied thereto for periodically correcting for the periodic drift to thereby improve the accuracy of the apparatus.

In a further embodiment a plurality of the apparatuses, preferably three, for determining a plurality of different distances are provided and further include means responsive to the plurality of determined distances for further determining a combined measurement value based on the values of each of the determined distances. Preferably the combined measurement may include trilateration computations for determining the position of the targets. Thus for example,

IN THE DRAWING

DESCRIPTION OF THE PREFERRED EMBODIMENTS

Figure 1A:
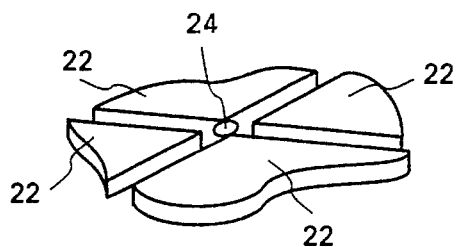
FIG. 1a is an isometric view showing a portion of the telescope surface of FIG. 1 in more detail.
Figure 1:
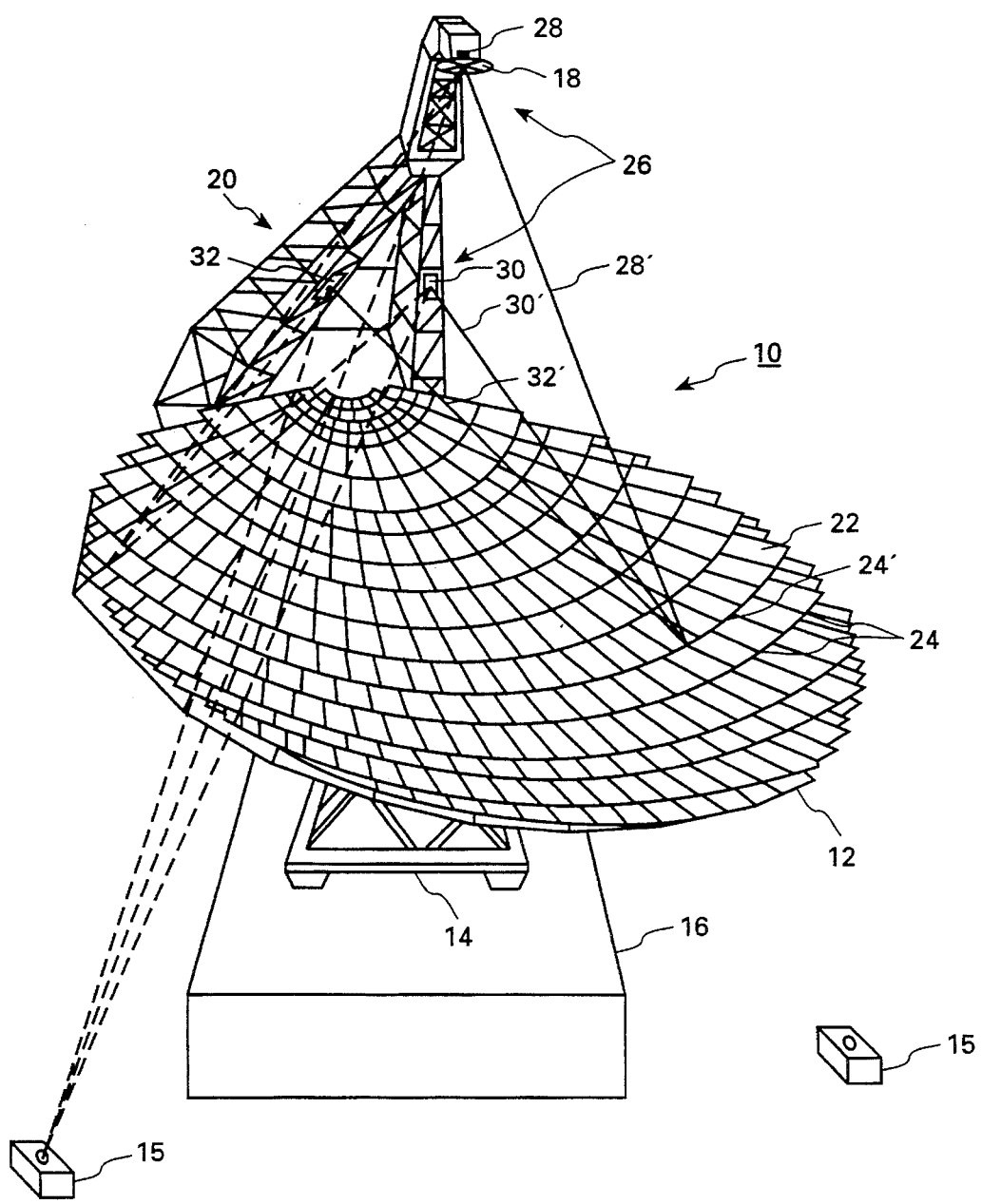
FIG. 1 is a front perspective view of a radio telescope including an embodiment of the present invention.
Figure 2:
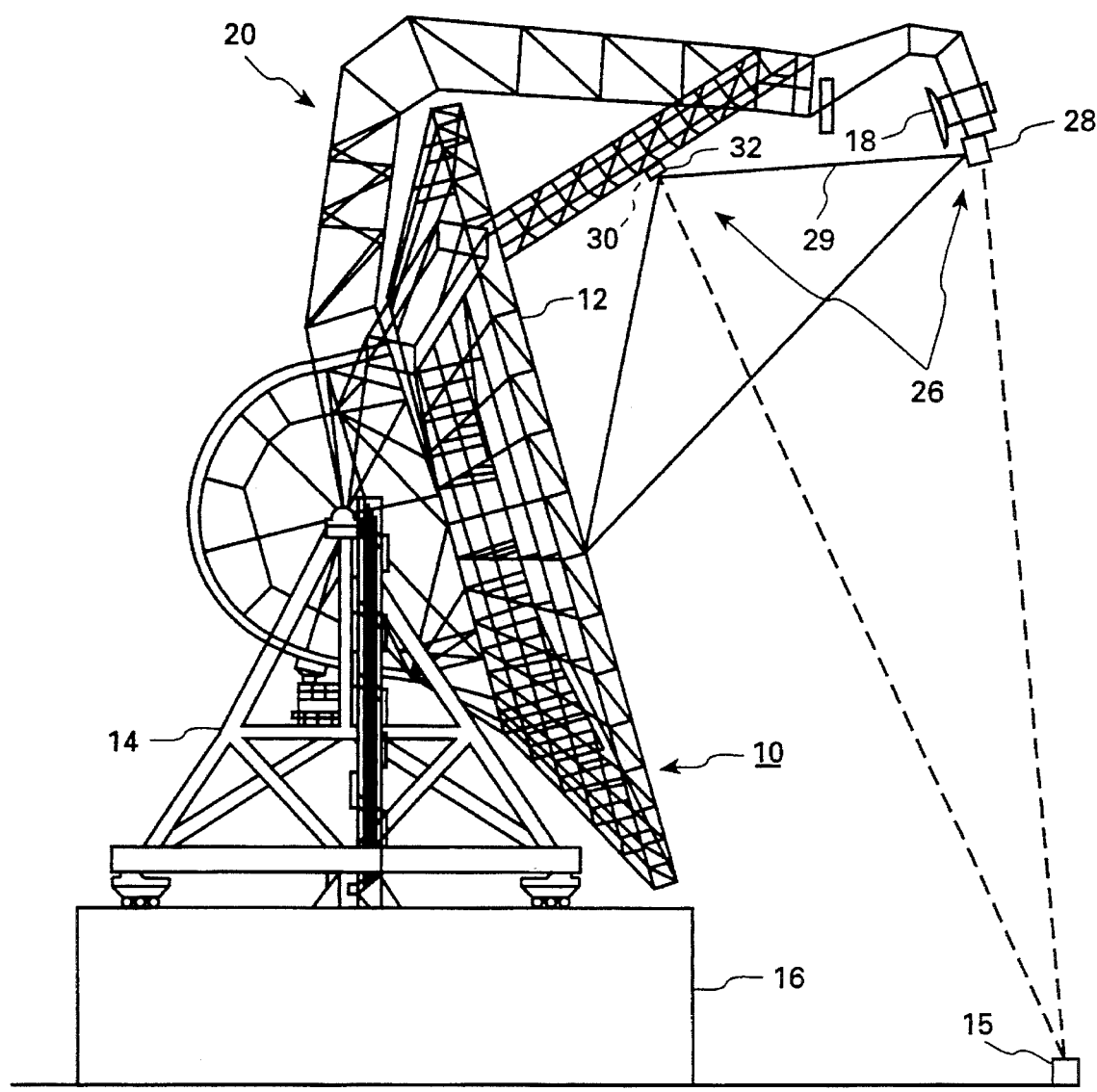
FIG. 2 is a side elevation view of the telescope of FIG. 1.

In FIGS. 1 and 2, a radio telescope 10 having for example a 100 m circular diameter aperture includes an antenna 12, a support frame 14 mounted on a pedestal 16 and a signal feed horn system 18 secured on a horn frame 20 secured to support frame 14. The antenna 12 comprises a plurality of panels 22, e.g., 2006 panels, each forming a segment of a parabolic surface. The panels are joined at their corners by connecting links not part of the present invention which include actuators constructed to displace the panels to form a continuous parabolic surface. At each of these intersections is a retroreflector cube 24, FIG. 1a. In this embodiment there may be for example over 2000 such cubes. It is desired to know whether or not the panels 22 are positioned such as to accurately form the desired parabolic shape which, for the desired accuracy, requires the cubes 24 to be in a desired position to within 50 μm as mentioned in the introductory portion. Also, it may be desired to insure the antenna is aimed accurately in the sky and therefore the position of the parabolic surface of the antenna 12 is needed for this purpose as well.

To measure the position of the panels via the cubes 24, a rangefinder system 26 according to an embodiment of the present invention is provided. The system 26 includes three rangefinders 28, 30 and 32 each generating an infrared laser beam 28', 30' and 32', respectively. The beams 28', 30' and 32' are all aimed at the same cube, e.g., 24', either simultaneously as shown or in some given sequence. The beams are caused to traverse all cubes 24 of the antenna 12 by a scanning system for the beams 28', 30' and 32' described below. The important data is that the distance to each cube 24 be measured, the system 26 including a computer for analyzing the data to compute by trilateration the location of each cube of the antenna.

The system 26 also includes one or more benchmark retroreflector cubes 15 located on the ground. An additional rangefinder (not shown) identical to rangefinders 28, 30 or 32 is used to correct for atmospheric conditions that cause measuring errors such as might be caused by refractive index variations and so on. The additional rangefinder is fixed relative to the ground to provide an accurate unchanging benchmark reference signal. The rangefinders of system 26 being mounted on the support frame 14 are subject to occasional motions and therefore are not sufficiently fixed for purposes of providing a benchmark reference. Also the benchmark cubes are used to determine the location of the triangle 29, FIG. 2, defined by the three rangefinders 28, 30 and 32. The cubes 15 are preferably located at least the same or a greater distance as the minimum distance from the rangefinders as that of the target cubes whose location is to be measured. For example, the benchmark cubes 15 should be at 120 to 150 m from the laser rangerfinder reference location in the present example. The cubes 15 in the Figures are not illustrated as located to scale. Triangle 29 is a reference whose position with respect to the ground is determined by range measurements from each apex of the triangle to any three targets on the ground. To position the triangle 29 relative to the ground to an accuracy of 0.5 arc seconds requires a range measurement accuracy of about 50 μm over a distance of about 130 m.

The reflector panel construction of the antenna 12 facilitates the measurement and adjustment of the surface. The position of corners of each panel 22 deviating from the required parabolic curvature is sensed. To maintain the correct surface shape in the presence of deformations in the backup structure, connections between the surface panels and backup structure are made through linear actuators (not shown) located at each junction of four panel corners. The reflecting surface is essentially a continuous sheet that may be adjusted to remove both the gravitationally induced deformations resulting from tilting the telescope and thermally induced changes in the backup structure. These deformations change slowly when compared to the speed at which the surface can be measured with the present invention.

It will be understood that should experience show that changes in position of the antenna panels 22 do not differ significantly in adjacent regions then the system 26 can be used to sample the cubes 24 at selected representative regions of the parabolic surface. Further, while the present embodiment is illustrated in connection with a radio telescope, the rangefinder system 26 is useful for measuring points on other large structures, for example buildings, bridges, dams and so on for monitoring such structures for significant displacements which might indicate a risk of structural damage. Such structures are meant to remain relatively fixed, rather than to be movable as the antenna 12, and therefore present a less complex distance measurement problem.

Each rangefinder 28, 30 and 32 may measure a distance to a surface retroreflector 24 and also to each of its neighboring rangefinders. The range data is processed in a computer, to be described below, to give the best-fit paraboloid surface. The adjustment required at each actuator to correct the departure from the best-fit surface is calculated and used to operate the appropriate actuator.

At its shortest operating wavelength, the antenna 12 has a diffraction beam of ~7 arcsec and accurate pointing of this beam presents a formidable problem. The determination of the best-fit surface is the first step towards a solution, since this means that the location of the paraboloid and the direction of its axis are known in reference to the surface measuring rangefinders. The position of these rangefinders with respect to fixed points on the ground are derived using measurements from ground-based rangefinders (not shown) surrounding the telescope. If these ranges are known to an accuracy of 50 μm, the telescope beam direction will be known to an accuracy of ~1 arcsec over most of the sky.

The specifications of the rangefinder system 26 result from the requirements of both accuracy and measurement speed. The speed of measurement is dictated by the rate at which the ranges to be measured are changing due to thermal effects and the excitation of various modes of oscillation of the telescope structure. System 26 has an accuracy of 50 μm for ranges up to 120 m and measures five ranges per second to meet these requirements, i.e., it measures the positions of five cubes 24 per second.

Figure 3:
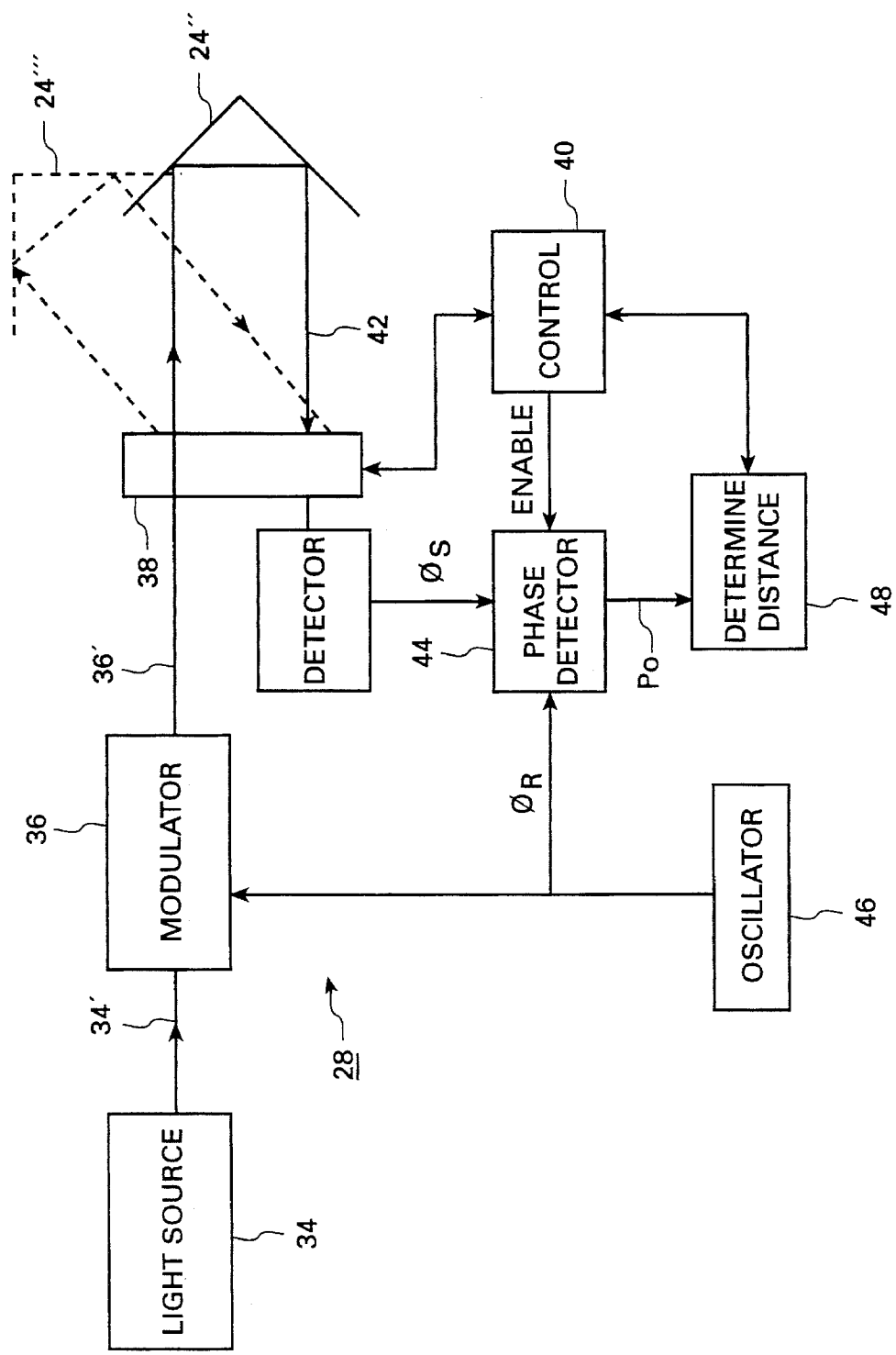
FIG. 3 is a block circuit diagram of a rangefinder according to an embodiment utilizing certain principles of the present invention.

In FIG. 3, a typical rangefinder 28 of system 26 of FIG. 1 includes a light source 34, generally a high speed laser diode as commercially available, preferably a 780 nm-1 mW output diode, a high frequency modulator 36, e.g., 1.5 Ghz, which modulates the source 34 output beam 34' forming a modulated beam 36' which is applied to a scan mirror 38. The mirror 38 is controlled by control 40 to direct the output beam 36' to a retroreflector cube 24". The reflected return signal 42 is received by the mirror and directed to phase detector 44. The phase detector may include internal elements (not shown in this figure) for employing intermediate frequencies for actual phase detection. Also, the phase detector 44 is illustrated as a discrete component whereas in FIG. 4, to be described, the phase detection is implemented in computer programming.

Figure 4:
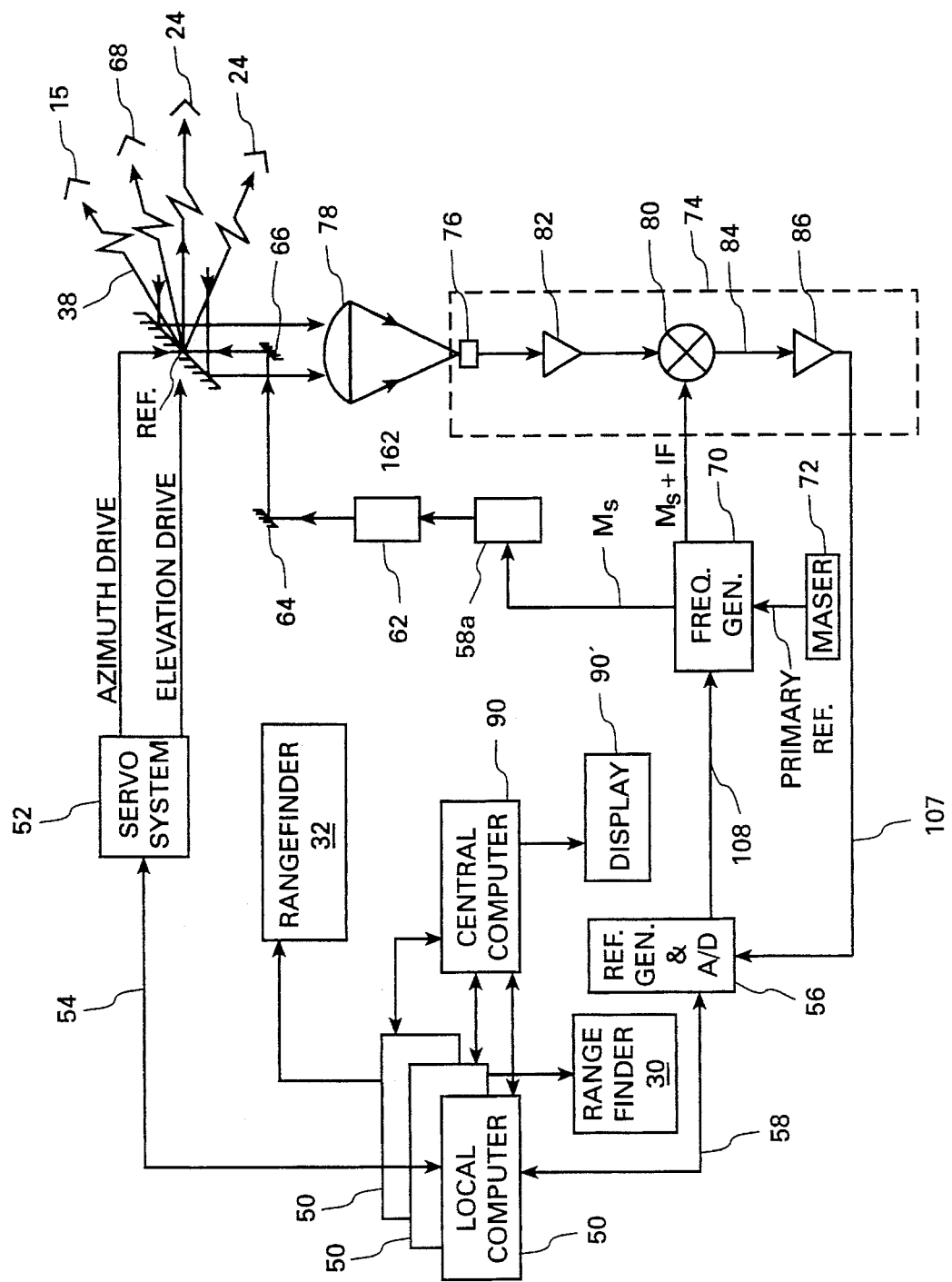
FIG. 4 is a block circuit schematic of a rangefinder according to a preferred embodiment of the present invention.

It should be understood that FIG. 3 is simplified from an actual system illustrated in FIG. 4. FIG. 3 is presented merely to illustrate general principles of certain aspects of the present invention whereas in practice the rangefinder of FIG. 4 is representative of one preferred implementation. The detector 44 receives an enable signal from the control 40 which starts the phase detection cycle. The detector 44 receives as one input a reference signal having a reference phase $\phi_R$ produced by oscillator 46. The oscillator 46 also applies this signal to modulator 36 to modulate the beam 34'. The phase $\phi_S$ of the intensity modulation envelope of the returned beam 42 is retarded with respect to the phase $\phi_R$ of the outgoing beam 36' by $2d/\lambda$, where d is the distance to be measured and $\lambda$ is the wavelength of the intensity modulation envelope and depends on the group refractive index of the atmosphere. If $\lambda<2d$, the phase will be retarded by more than one cycle and ambiguities in distance reading arise. The phase detector 44 output signal Po is proportional to $\phi_S-\phi_R$, where $\phi_R$ is a constant and $\phi_S=2d/\lambda$rad. The phase detector output signal Po repeats every $2\pi$ radians and is $\phi_S=[(2d-n\lambda)/\lambda]2\pi$, where $(2d-n\lambda)<\lambda$ and n is an integer.

Using a modulating frequency of 1.5 Ghz for signal 36', the output signal Po of the phase detector 44 repeats approximately every 10 cm. In some applications, this ambiguity is resolved by a change of modulation wavelength but here all distances are sufficiently known such that resolving the ambiguity is unimportant.

The output of the phase detector 44 is applied to a distance determining circuit 48 which calculates the distance measured based on the measured phase difference. Control 40, which may be a programmed computer, as is the circuit 48, determines when the desired data has been received by the circuit 48 so that calculation of the distance can begin. At this time the control 40 displaces the mirror 38 to direct the modulated beam at the next retroreflector cube 24'''. This process is continued for all of the cubes 24 and for all three rangefinders 28, 30 and 32. Not shown in FIG. 3 are reference cubes 15 for generating benchmark correction for ret? active index variations or for other correction factors which are explained in more detail below in connection with the embodiment of FIG. 4.

In FIG. 4, representative rangefinder 28 is shown, it being identical to rangefinders 30 and 32. In the present embodiment, the laser rangefinders 28, 30 and 32, FIG. 4, are shown with a benchmark measurement capability. However, as mentioned above, because these rangefinders are secured to the support 14 which may exhibit motions, it should be understood that the benchmark measurement in these rangefinders is shown for purposes of illustration. In practice, in this embodiment, the benchmark measurements would be made by a separate identical rangefinder as described in FIG. 4 but fixed in position relative to the earth via a relatively immobile structure. The fixed rangefinder would aim its beams at the cubes 15 to provide a reference correction factor for the index of refraction of the atmosphere to be utilized be rangefinders 28, 30 and 32. The rangefinders 28, 30 and 32 therefore would not aim their beams at cubes 15 for creating a benchmark reference signal. Rangefinder 28 includes a local computer 50 which sends and receives signals to servo system 52 via data bus 54 and to phase detector 56 via data bus 58. It should be understood that single lines herein may comprise single conductors or multiple conductors or a data bus as appropriate. Servo system 52 provides azimuth and elevation drive signals to mirror 38 for rotating mirror 38 about two orthogonal axes. Servo system 52 also includes a position encoder for each axis for sensing the mirror position and telling the computer the position of the mirror. The computer instructs the servo system as to what points to measure, that is, to what cubes 24 the measuring beam is to be aimed and in what sequence. This will be explained in more detail in connection with FIG. 5. The mirror 38 position at the intersection of these axes provides a reference location for the transmitted beam.

An analog to digital converter and reference IF signal generator 56 receives an intermediate frequency (IF) detected signal 107. The signal 107 is applied to A/D converter portion of generator 56 which digitizes the signal 107. Generator 56 generates an IF signal 108 which is a reference used by frequency generator 70. Upon receipt of a command from computer 50 the digitized signal is sent to the computer which processes this data and computes the phase differences. The local computer 50 also periodically corrects for zero offset in the circuitry and refractive index error as will be explained. From the computed phase differences the computer 50 then calculates the corresponding distances using known computation methodology. Generator 56 anti computer 50 will be discussed in more detail below in connection with FIG. 5. After the computer 50 computes the phase differences and determines the distances, this data is transmitted to the central computer 90 at the instruction of the computer 90 for further processing.

A transmitter 58a receives the modulation signal Ms from frequency generator 70 at 1.5 Ghz. Sinusoidal variation of the current through the transmitter diode modulates the intensity of the outputted transmitted beam. The modulated light beam is transmitted from transmitter 58a through optical isolator 62 to mirror 64 and mirror 66 to scan mirror 38 which transmits the modulated laser beam to the selected $cube_{1-n}$, to a local cube 68 at the mirror 38 location for providing a reference beam as will be explained and to benchmark cube 15 for correcting the measured distances as will also be explained.

Frequency generator 70 is responsive to maser 72 for generating signal Ms and a signal Ms+IF in response to a reference IF signal produced by phase detector 56. Preferably reference signal IF is 1 Khz. The receiver 74 includes a return laser beam detector 76, a fast silicon device, which receives the focused returned beam through light collecting lens 78 and applies its output signal to mixer 80 through amplifier 82. Mixer 80 receives the signal Ms+IF from generator 70 and produces an output modulated IF signal on output conductor 84 which is applied to the phase detector 56 through amplifier 86.

Optical alignment ensures that the transmitted and received beams are coaxial. The divergence of the transmitted beam from mirror 38 is such that the beam received at the distant retroreflector cube 24 has a diameter several times that of the retroreflector. Consequently, positioning of the light beam with respect to the retroreflector is not critical; an angular positional accuracy of 20 arcsec is more than adequate.

The phase of the resultant 1 Khz intermediate frequency of the mixed return signal is directly related to the phase of the 1.5 Ghz modulation envelope of the returned signal and is a measure of the path length to the designated retroreflector cube with the restriction of the ambiguity previously mentioned.

Three of the rangerfinders just described comprise system 26. The local computer 50 of each of the three systems is connected to the central computer 90, FIG. 4a, which instructs each computer 50 as to what cubes to direct its beam at and ill what sequence via instructions 89. The central computer receives range information 87 corrected for index of refraction index and zero offset from each of the three rangefinders and performs a trilateration computation on the received data. The central computer 90 gives the local computer 50 a list of points at which measurements are to be taken. The central computer 90 knows the position of all of the cubes and thus can compute the error based on programmed actual or desired position information for each cube. The information can be stored as a table or be included in the programmed instructions. The central computer 90 also is coupled to a display 90' for displaying the desired information.

Figure 4A:
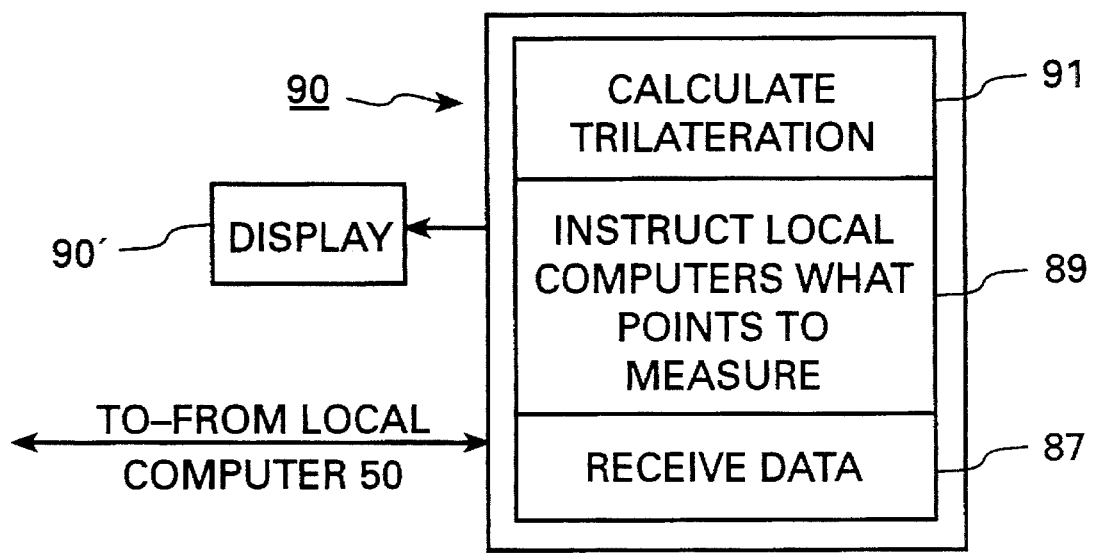
FIG. 4a is a diagram showing the central computer in more detail as utilized in the embodiment of FIG. 4.

To compute trilateration, the central computer 90 is given the corrected distances determined by each rangefinder to each cube. Computer 90 also is given the coordinates of each rangefinder to a reference location, e.g., a center point of the antenna foundation pedestal 16. Computer 90 thus can compute the radius to each cube since the three arc lengths from the three rangefinders intersect each cube. The computer 90 is instructed to guess a nominal point position of each cube. A commonly known algorithm 91, FIG. 4a, is used to then iteratively compute the solution of the trilateration computation solving for three polynomial equations. Using this computation, the coordinates of each measured cube is determined providing the measured coordinates of each cube position. These measurements are made repetitively.

A typical sequence of operations is for the central computer 90 to issue a series of commands for the retroreflector cube 24 positions, the local computer 50 then drives the beam steering mirror 38 to the first of these, computes a range, stores the result, and moves on to the next retroreflector. At the end of the measurement sequence, the results of the measurement are passed on to the central computer 90.

In order to calibrate slow drifts of the zero point of the instrument, the beam steering mirror 38 is used to make a measurement of the known length of a reference path to reference cube 68 within the instrument at regular intervals. One calibration measurement per minute is sufficient to reduce the zero-point error to less than 5 μm. The calibration measurement is used by the computer 50 by programmed instructions to correct the actual measured distances occurring after the determination of the correction factor.

Figure 5:
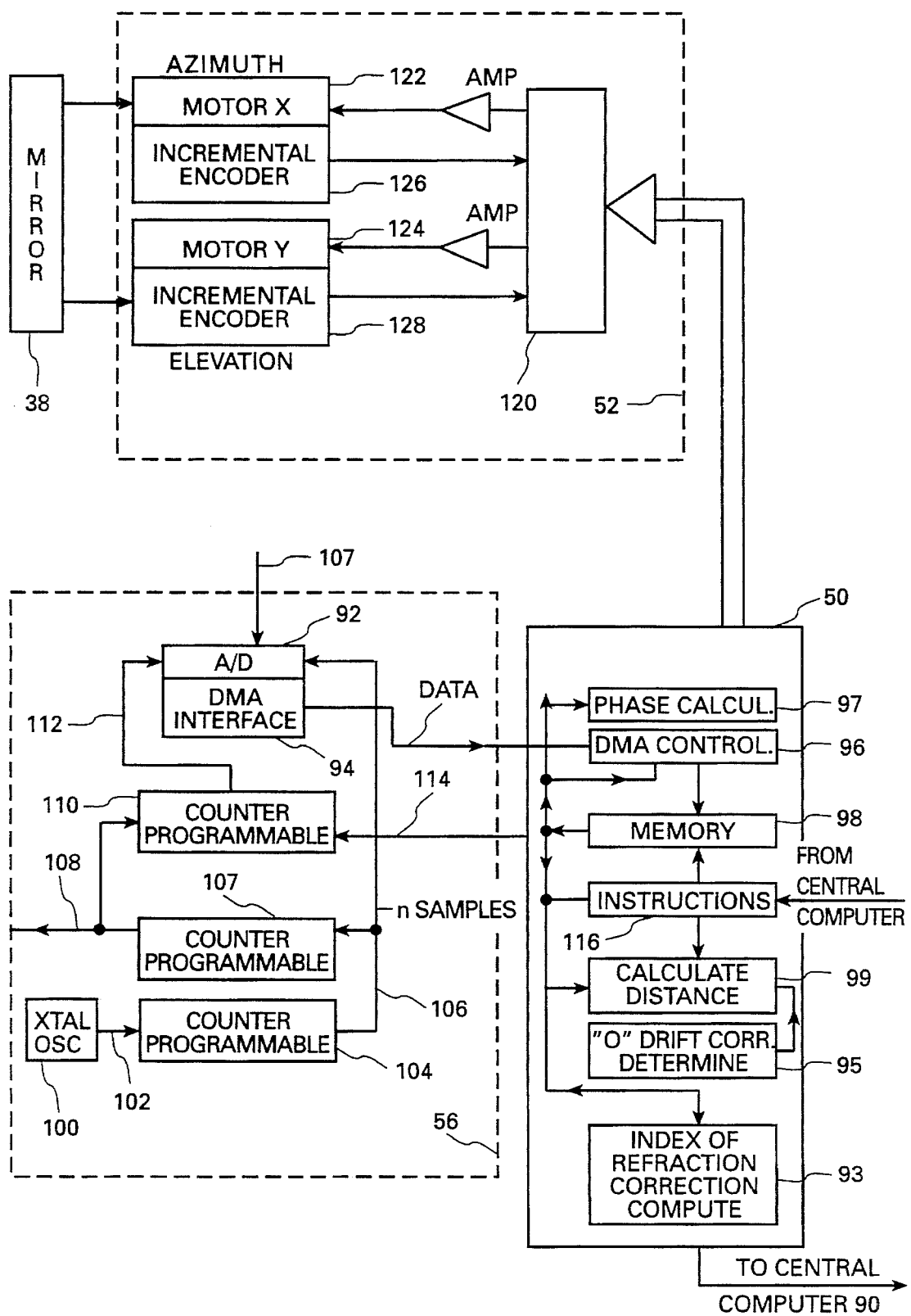
FIG. 5 is a circuit diagram of the local computer, servo system and reference signal generating portions of the circuit of FIG. 4.

Computer 50 then corrects for refractive index error also using programmed instructions 93 FIG. 5 employing the benchmark distance signal. That is, the distance to the benchmark target is computed and this is used as a reference against the actual known distance to that benchmark target which is stored in the computer. The computer 50 compares these two values and the difference is the correction factor. This factor is then applied to subsequently measured distances to correct the measured results. Known techniques are used to correct for the different distance values.

Figure 6:
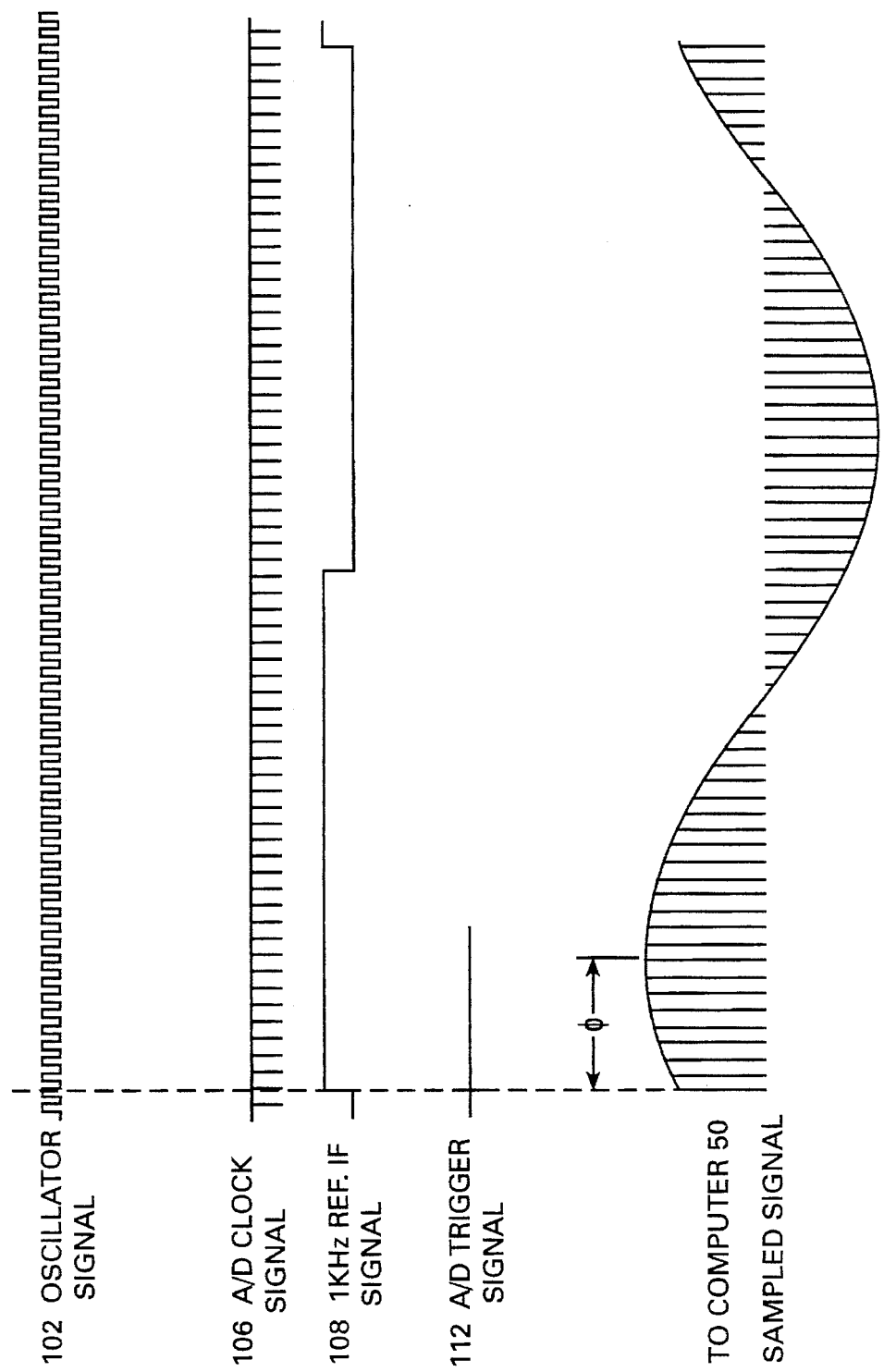
FIG. 6 is chart of waveforms used to explain the principles of phase detection.

In FIG. 5, the A/D and reference signal generator 56 comprises an A/D converter 92 on a circuit board which includes a direct memory access (DMA) interface circuit 94. The DMA circuit 94 supplies the A/D output signals to the computer 50 DMA controller 96. The DMA controller places this information in memory 98 in the computer 50. A local crystal oscillator 100 generates a signal, e.g., 10 Mhz, waveform 102, FIG. 6. This signal is applied to programmable counter 104 which counts down the signal 102 into a digital signal 106 and applies this signal to programmable counter 107 which generates reference IF signal 108 which preferably is 1 Khz. The signal 106 has n pulses per cycle of IF signal 108, preferably n being 64, which is arbitrary. Signal 108 is applied to programmable counter 110 which produces a trigger signal 112 upon receipt of an enable signal 114 from computer 50. See FIG. 6. The detected IF return signal outputted by amplifier 86, FIG. 4, is sampled by the converter 92 at n, i.e., 64, times in each reference IF signal 108 cycle. These samples are sent to the computer 50 memory by DMA controller 96.

The accurate measurement of the phase requires high spectral purity of both the 1.5 Ghz transmitter and the 1.5 Ghz+1 Khz local oscillator. Any noise of these two oscillators at a frequency of 1 Khz away from the desired frequency will add noise to the 1 Khz intermediate frequency and, consequently, degrade the accuracy of the range measurement. Therefore, the purity of the oscillators is important for operation of this system.

The enable signal 114 is preferably generated once in this embodiment for every measurement. Computer 50 via resident instructions 116 performs the phase calculation 97 on the resultant 8192 points for determining the phase differences between the return signal 107 digitized by converter and generator 56 and reference IF signal 108. This information is then used to calculate the measured distances using known techniques with distance calculator instructions 99 in computer 50.

Once the computer 50 gets all of the data for a given calculation from the converter 92, it is given a one bit signal indicating this. When so informed the computer performs its calculations and simultaneously therewith sends a control signal to the servo system controller 120 to move mirror 38 to aim the beam at the next cube. This is a commercially available controller whose details need not be given here. The controller 120 sends appropriate control signals to the azimuth and elevation motors 122 and 124, respectively, of the mirror 38 to direct the beam to the next retroreflector cube. The motors as commercially available include incremental encoders 126 and 128, respectively, for providing position indicating signals to the controller 120.

To make the phase measurements, 16-bit analog-to-digital converter 92, synchronized to the 1 Khz reference signal, is used to sample the 1 kHz signal into a sequence of samples $s_j$. The Fourier components of the fundamental harmonic for retroreflector i are $$a_i = \sum_{j=0}^{mn-1} S_j \cos\left( \frac{2\Pi j}{n} \right),$$

$$b_i = \sum_{j=0}^{mn-1} S_j \sin\left( \frac{2\Pi j}{n} \right),$$

where n=number of samples per cycle and m=number of cycles sampled.

The signal amplitude and phase are $$A_i = \frac{2}{mn} (a_i^2 + b_i^2)^{1/2},$$

$$\phi_i = \tan^{-1}\left( \frac{b_i}{a_i} \right).$$

In the present embodiment, the number of samples n is 64 and m is 128.

Figure 12:
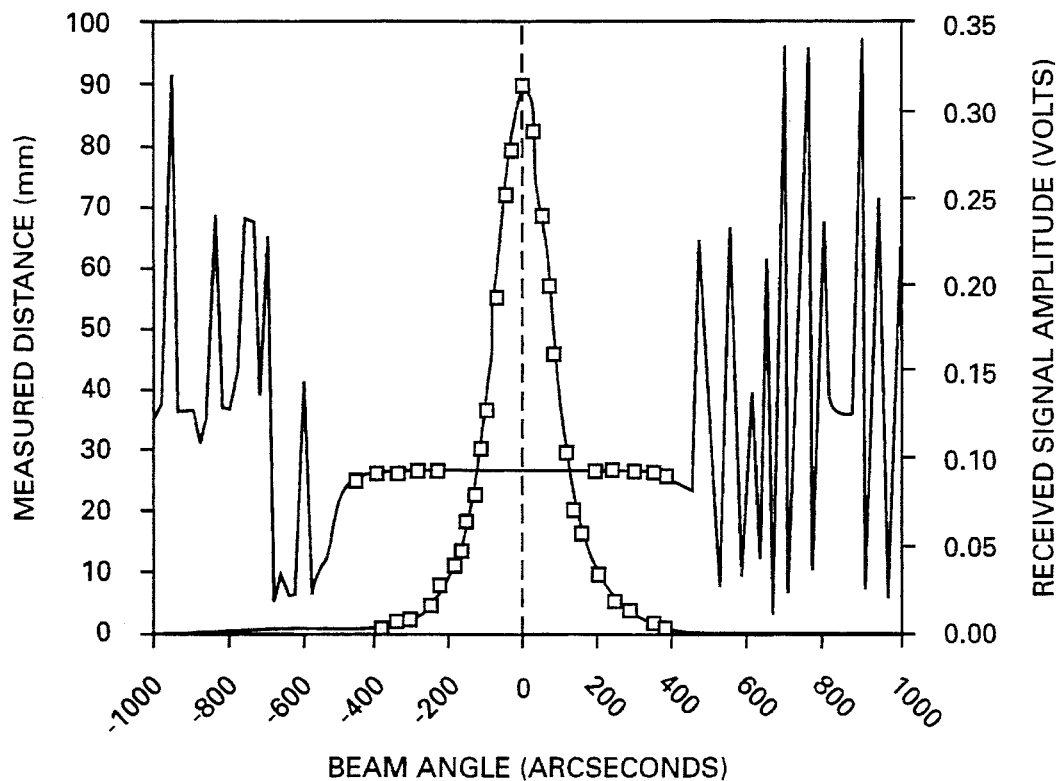
FIG. 12 is a chart illustrating the range variation of the measured distance as compared to the received reflected signal amplitude.
Figure 14:
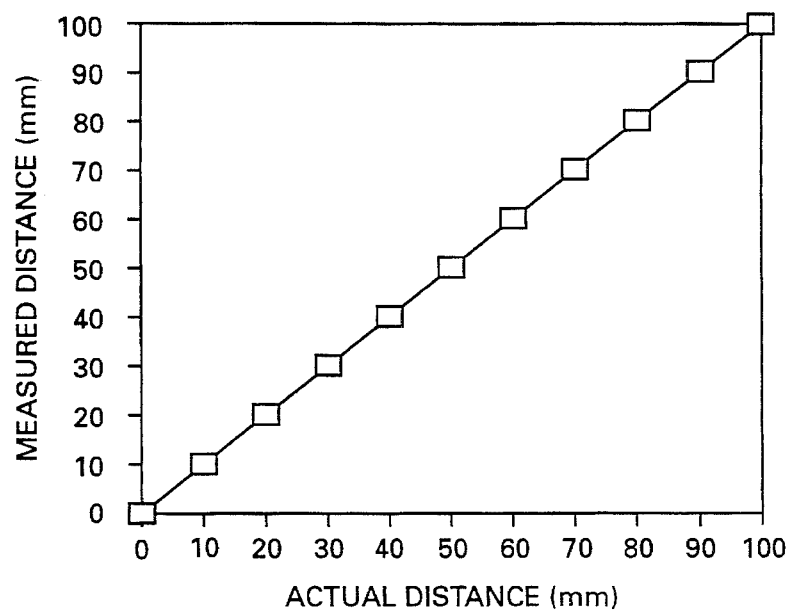
FIG. 14 is a chart illustrating the linearity of the measured distance as compared to actual distance

The effectiveness of this phase detection method is illustrated in FIG. 12 which is a record of received amplitude and computed phase as the transmitted beam is scanned across a retroreflector in a test apparatus employing a rangefinder constructed according to the present invention. The computed distance remains constant over a change of amplitude in received signal of several orders of magnitude.

Figure 7:
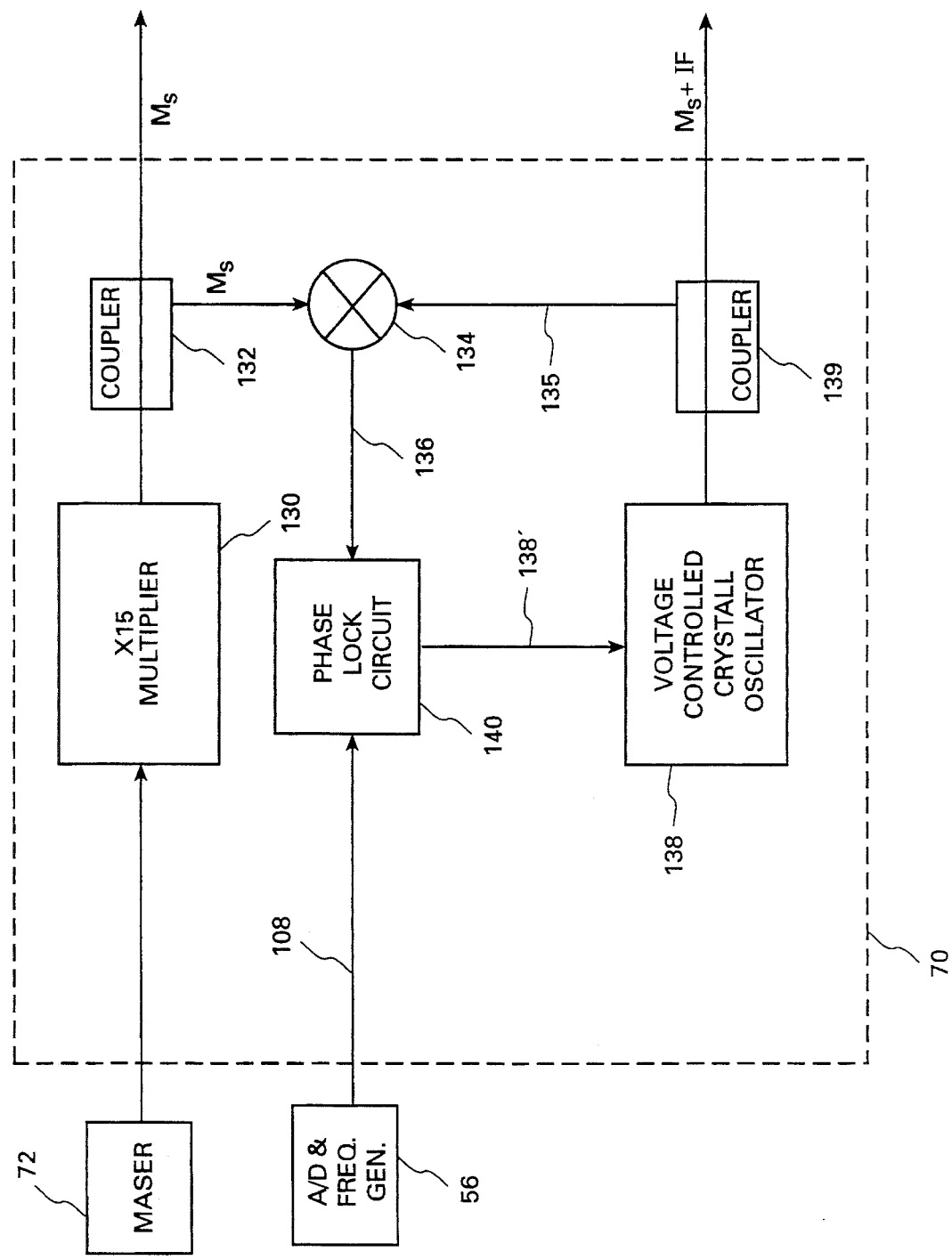
FIG. 7 is a more detailed circuit diagram of the frequency generator of FIG. 4.

The frequency generator 70 is shown in FIG. 7. Another requirement of the oscillators of the system, in addition to that discussed above regarding the phase detector, is that of absolute stability. An accuracy of 10 μm in a range of 120 m is better than 1 part in $10^7$, so the stability of the oscillators must be greater than this. A hydrogen maser 72 preferably at 100 MHz output is used as the frequency standard providing a long-term stability of 1 part in $10^{15}$. A commercially available ×15 multiplier 130 receives the 100 MHz signal from maser 72 and outputs a stable 1.5 GHz modulating signal Ms to the laser diode of the transmitter 58a, FIG. 4. A coupler 132 feeds the signal Ms to mixer 134. A second signal 135 applied to mixer 134 is received from the voltage controlled oscillator 138 via coupler 139. The mixer 134 outputs a difference frequency signal 136 maintained at 1 KHz by phase locking to the reference IF signal 108 with phase lock circuit 140. This is the result of combining a voltage controlled signal 135 Ms+IF, 1.5 GHz+1 kHz, output by voltage controlled oscillator (VCO) 138, with the 1.5 GHz Ms signal output by multiplier 130. These signals are phase locked by circuit 140 which applies the resulting DC voltage 138' to VCO 138. The coupler 139 applies the VCO 138 output signal 135 Ms+IF to mixers 80 (FIG. 4) and 134.

Figure 8:
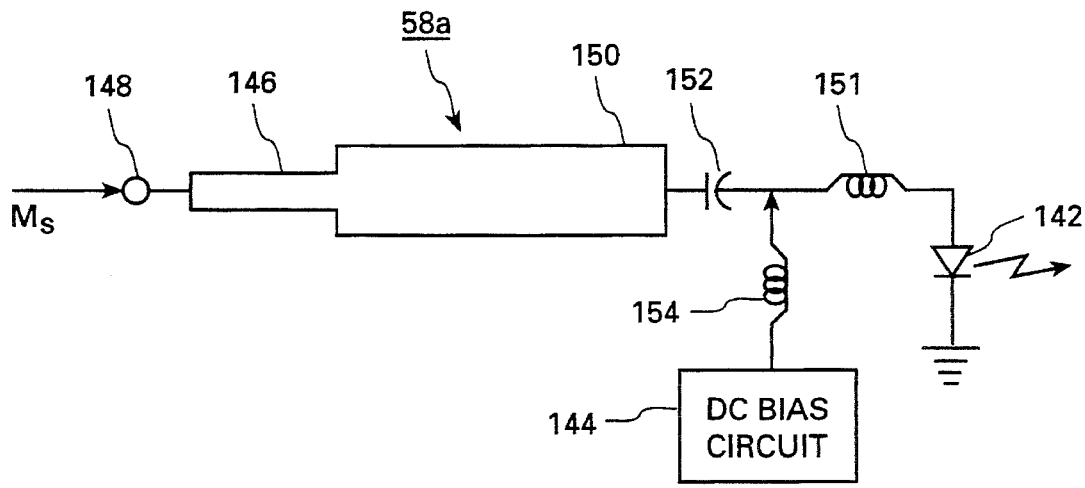
FIG. 8 is a more detailed circuit diagram of the rf transmitter of FIG. 4.

In FIG. 8, the rf transmitter 58a laser diode 142 is modulated by varying the bias current with signal Ms about a fixed DC value produced by circuit 144. The matching and bias circuit includes a 50 ohm microstrip line 146 connected at one end to terminal 148 which receives the modulation signal Ms and at the other end to microstrip 150 which is 25 ohm and comprises a wavelength of λ/4 at 1.5 GHz. To obtain a usable modulation depth, the 1.5 GHz rf modulating signal must be power matched to the diode impedance (~10 Ω) in the presence of the parasitic capacitance (not shown) and the parasitic lead inductance 151 associated with the diode package. The parasitic lead inductance 151 is series resonated at 1.5 GHz using a chip capacitor 152 coupled between microstrip 150 and the diode 142 cathode. The dc bias is supplied from circuit 144 to the diode cathode through rf choke 154. The diode impedance is transformed to 50 Ω using the microstrip 150 quarter-wave transformer. A return loss of less than −15 dB is at the transmitter rf input terminal 148. A modulation depth for an rf drive level at 1 mW is estimated to be 30%.

Figure 10:
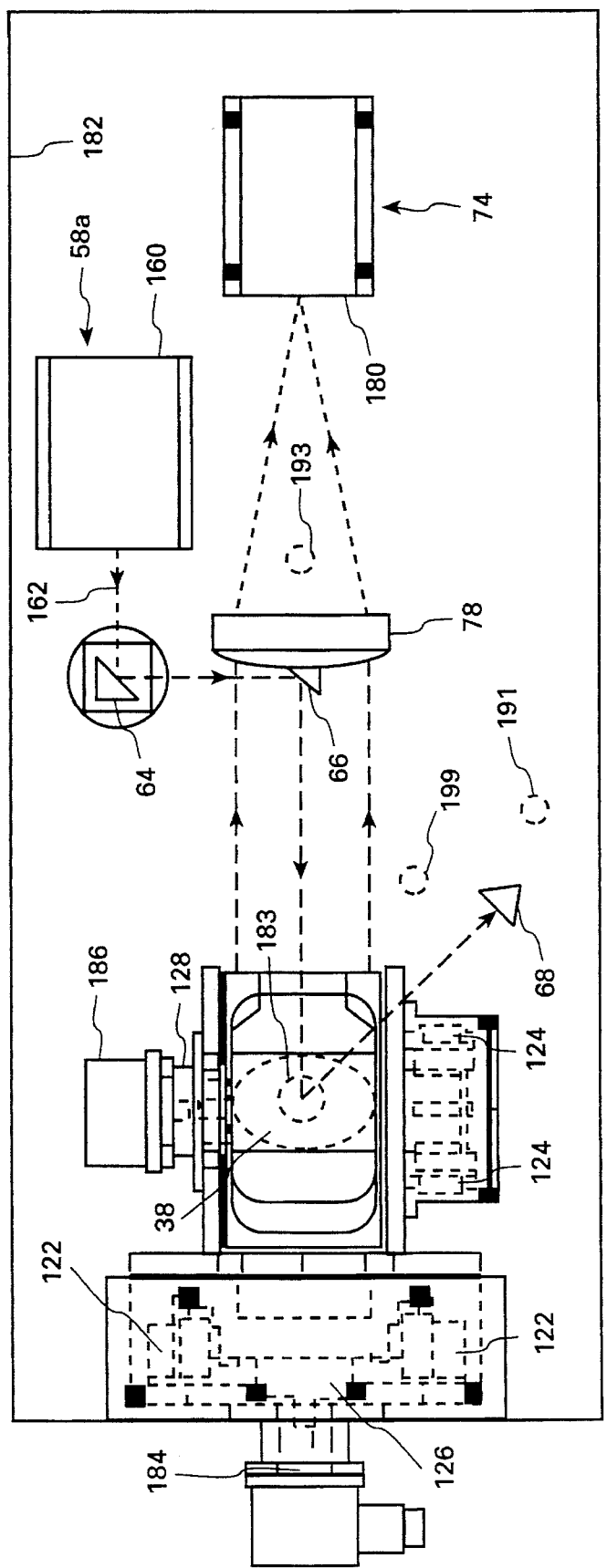
FIGS. 10 and 11 are respective plan and side elevation views of the switching mirror, laser and detector portions of the apparatus according to an embodiment of the present invention.

The laser diode 142 and all associated biasing components are contained in a well-shielded enclosure 160, FIG. 10. The laser diode 142 is provided within integral GRIN lens collimator (not shown) in the enclosure 160 to produce a 1.5×2.0 mm beam 162 having a beam divergence of 1 mR. This beam emerges from the transmitter through a small aperture in enclosure 160.

Figure 9:
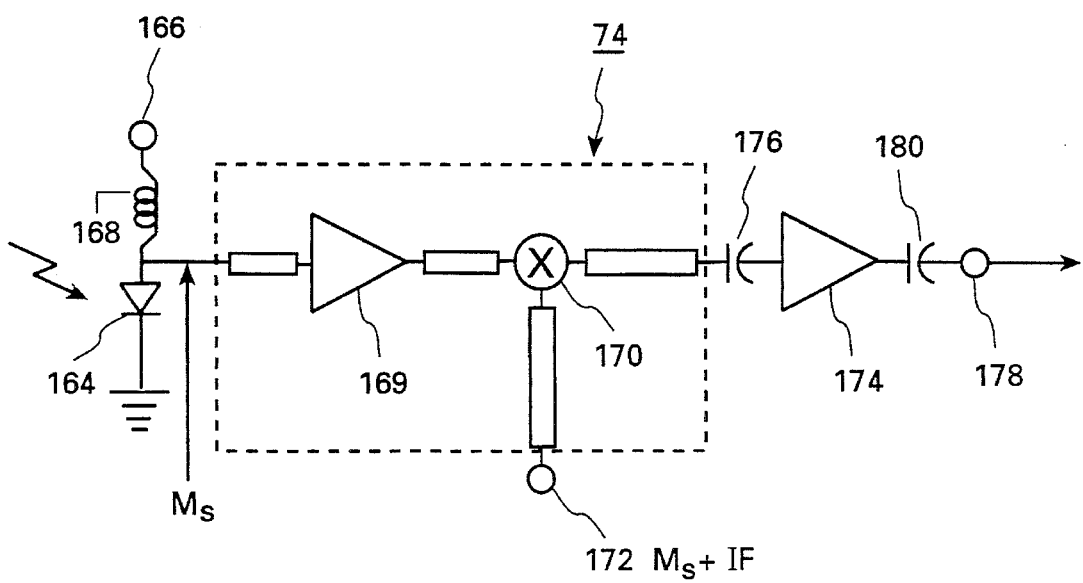
FIG. 9 is a more detailed circuit diagram of the receiver of FIG. 4.

In FIG. 9, the receiver 74 comprises a photodetector diode 164 whose anode is coupled to a reference potential and whose cathode is coupled to DC bias terminal 166 through an rf choke 168. The diode cathode is connected through an rf amplifier 169 (20 dB) to a double-balanced mixer 170. The mixer receives at terminal 172 the phase locked signal Ms+IF from the frequency generator 70. The mixer 170 output 1 kHz IF signal, which is dc isolated from the mixer, is further amplified (×300) using low-noise op-amp 174. Amplifier 174 is coupled via capacitor 176 to mixer 170 and to terminal 178 via capacitor 180 at its output. The rf components are interconnected using 50 Ω microstrip and all the components are mounted within a metallic enclosure 180, FIG. 10. Particular care should be taken to filter all power supply connections.

Leakage of signals at the transmitter frequency into the receiver circuits is highly undesirable and will lead to a nonlinear response to changes in target distance. In order to keep the resulting errors below 10 μm, any leakage signal at the phase detector 56, FIG. 4, must be less than one ten-thousandth of the voltage resulting from the optical return signal. This level of isolation requires care in design and construction.

The basic requirements of the beam switching mirror 38 are a positioning accuracy of preferably about 20 arcsec and an ability to switch between positions separated by ~2° in less than 70 ms. This follows from the requirement to measure five points per second on the surface of the telescope 12 (this assumes that adjacent measurement points have a separation of one panel width). If there is 128 ms integration time per point, then 72 ms remain for mirror movement and settling.

Figure 11:
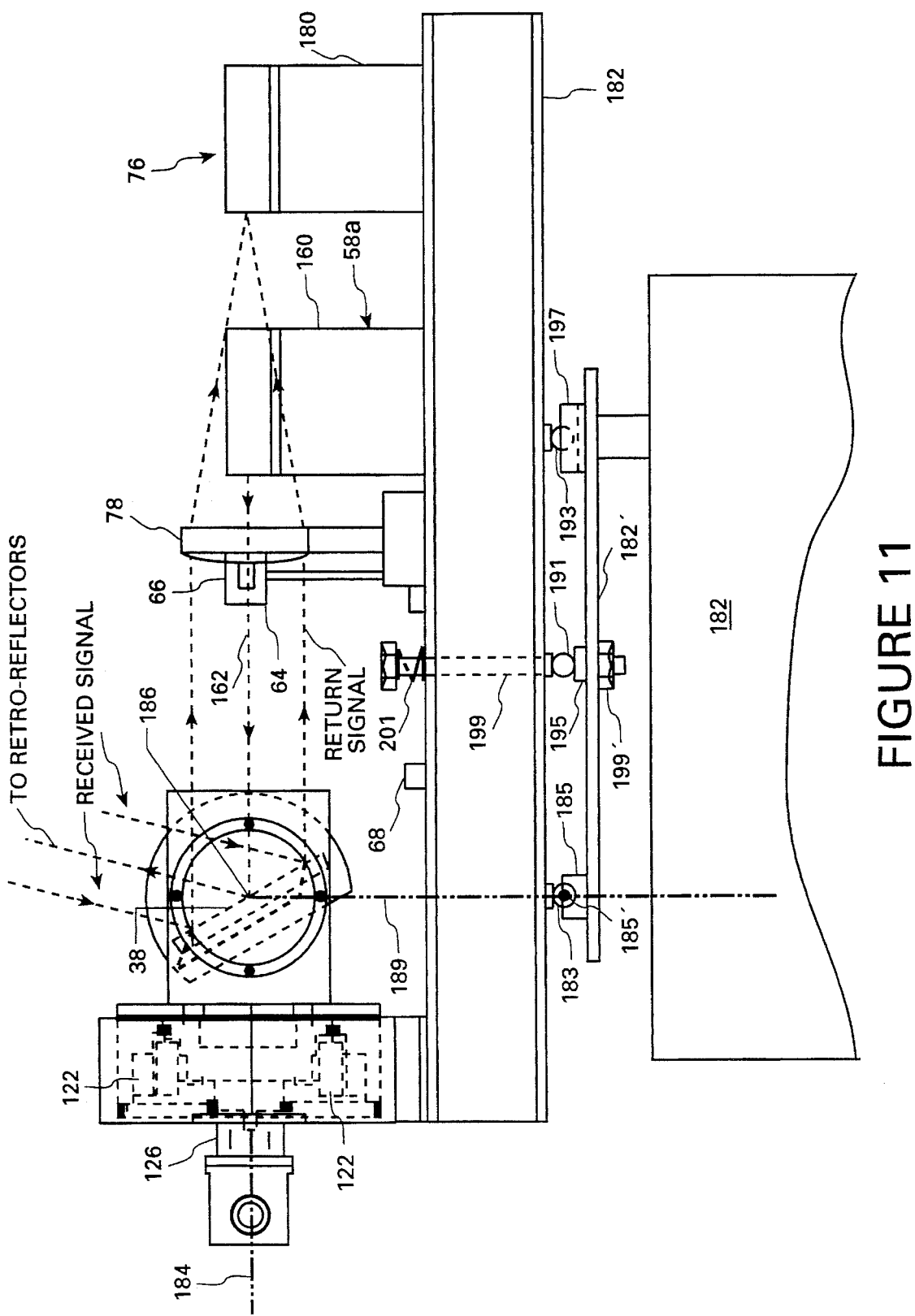

In FIGS. 10 and 11, the mirror 38, transmitter 58*a* and receiver 74 are all mounted to a common reference support 182. Support 182 is provided a reference location in the system 26, FIG. 1, that is stable and accurate to the extent permitted by the structure to which it is attached. In FIG. 11 the support 182 is mounted via a first ball 183 in a socket 185 secured on an accurately located base 187. The ball 183 rotates about point 185' but cannot linearly displace. The point 185' is on axis 189 orthogonal to the plane of and intersects the intersection of axes 184 and 186. This intersection does not linearly displace.

The support 182 is also secured to base 187 by balls 191 and 193. Ball 191 rests on a plane surface 195 supported by plate 182' and is free to displace in any direction on surface 195. Ball 193 lies in a V-shaped groove 197 in a member supported by plate 182'. Groove 197 extends in the axial direction of axis 184 and ball 193 can only displace in the directions parallel to axis 184. Balls 183 and 193 are axial aligned beneath and parallel to axis 184. Ball 191 is offset from this alignment to one side to form a triangular support for support 182. Plate 182' is supported by base 187. A bolt 199 passes through support 182 and is secured to plate 182' by nut 199'. A spring 201 compressively resiliently urges the balls against their mating surfaces.

Since the distances being measured are referenced to the mirror 38 at the intersection of the azimuth axis 184 and elevation axis 186 which are at the reflecting surface of the mirror, the mirror 38 cannot displace from this location. This is a critical location from which the retroreflector distances are measured and does not change as the mirror 38 is rotated. Each rangefinder is similarly mounted to its supporting structure in FIGS. 1 and 2.

Lens 78 has a transmitted beam (162) directing mirror 66 secured centrally thereto and a second mirror 64 directs the laser beam 162 from transmitter 58*a* to mirror 38. Mirror 38 preferably is a precision elliptical flat mirror and is commercially available.

Motion in two orthogonal azimuth and elevation axes 184 and 186 which intersect at the mirror reflecting surface is provided by a two-axes mount, the mirror being driven about each axis by a corresponding direct drive torque motor 122 and 124, respectively. Each axis position is sensed by a corresponding respective incremental encoder 126 and 128, having a resolution of $10^5$ pulses per revolution. A commercially available servo controller 120, FIG. 5, is used to complete a closed-loop servo for accurate positioning of the mirror 38 and contains the hardware required to provide a high performance positioning servo without the need for velocity sensors or analog compensation.

On turn-on, the local computer 50 instructs the azimuth and elevation servos to return to a home reference position. This is automatic on commercially available servo controllers. This position is referenced at a precise predetermined angle. All positions of the encoders are referenced to the home position. The incremental encoders sense angular positions. The local computer has in memory the azimuth and elevation positions of each retroreflector cube. The controller 120 outputs an analog DC error signal which is amplified and applied to the appropriate motor. The mirror moves until the desired angular positions are reached.

The initial coordinates of each cube are determined manually by observation of the laser beam of each rangefinder as it is incident on a cube. The coordinates are then manually entered into computer 50. A series of amplitude readings around the suspected center of the cube are taken, and a 3×3 convolution fit is made by computer 50 to determine the exact optical center. This information on the coordinates is then placed in a computer 50 file.

In operation, the laser system 26, FIG. 1, is caused to traverse the cubes 24 in the desired sequence at the rate of five cubes per second. The local computers 50 of each rangefinder, upon command of the central computer 90, instructs the servo controller of each rangefinder 28, 30 and 32 to scan the cubes with the modulated beams, each cube being scanned by all three beams in the sequence. The 128 cycles of the 64 samples are taken of the received beams from each measured point and stored locally. Each local computer then computes the phase differences for that point according to the method discussed above. The phase difference result is then processed to provide a measured distance corrected for zero point and refractive index.

While the computations are in progress after the data is taken, the mirrors are scanned to the next series of points. The central computer 90 then calculates the trilateration computation from the received data, storing and displaying the results as desired. Periodically, the local reference cube 68 is used to provide correction for the circuit drift and periodically the benchmark cube(s) 15 is used to provide a correction for atmospheric conditions. The benchmark cube 15 is located at least the same distance as the cubes 24 to be measured and represent closely the atmosphere in the target cubes 24 paths. The computers automatically enter the corrections in the calculations of the measured distances. Preferably the circuit drift is corrected every 30 seconds and the benchmark correction may be generated every minute or so. However, these may be set to other values in accordance with a given implementation.

Figure 13:
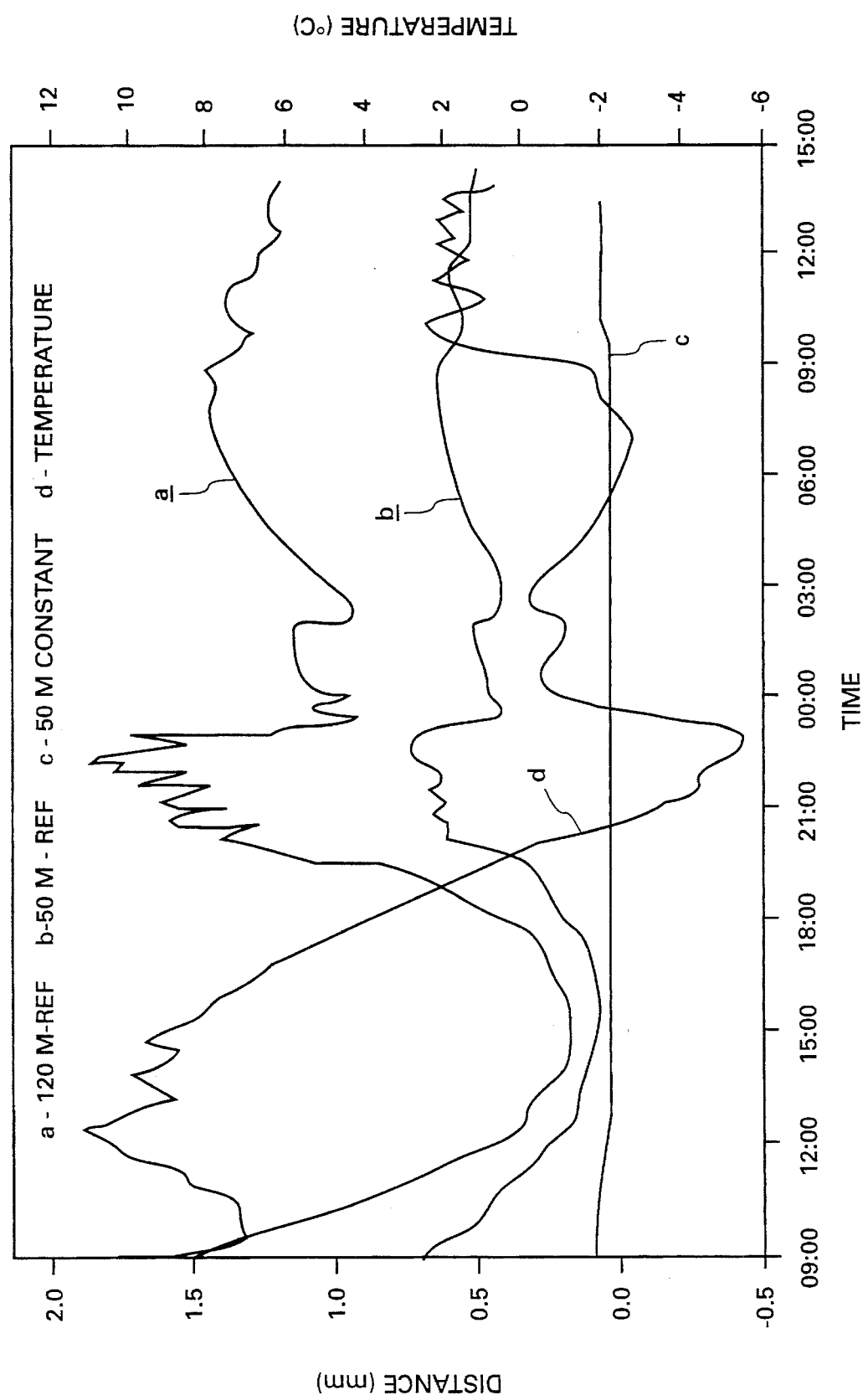
FIG. 13 is a chart illustrating correction for refractive index variation on a measured unknown distance of 50 m using a benchmark reference signal generated using a known distance 100 m reference target.

Of interest is the effect of temperature on the resulting readings and the effectiveness of using a bench mark reference signal to correct for atmospheric refractive index. FIG. 13 curves a and b illustrate bench mark laser beams at different ranges 50 m and 120 m. Curve c is a corrected data curve using data generated by benchmark reference signal a. This illustrates the effectiveness of the refractive index correction according to the disclosed system. It should be noted that over a 30 hour period curve c is corrected curve b having an rms of 18 µm. Curve d is the temperature. Sensitivity of the speed of light in the atmosphere is approximately 1 ppm/°C., e.g., 100 µm/°C. at 100 m. Therefore, this is significant and should be compensated. Thus, correction factors may be introduced into the computer calculation equations for the determination of distances taking into consideration refractive index.

Figure 16:
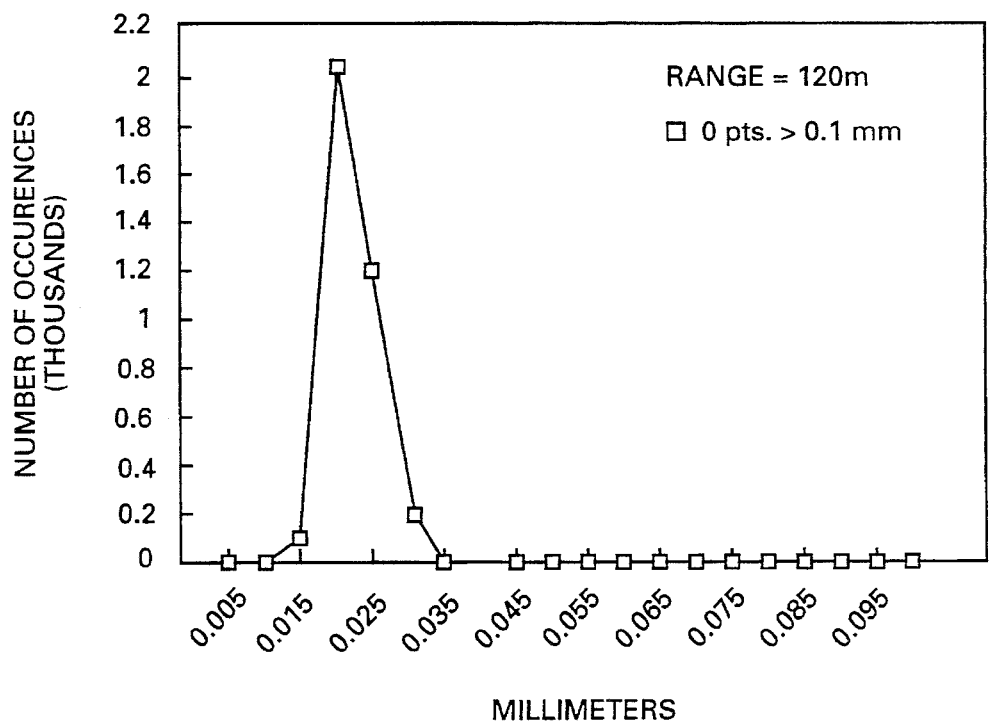
FIG. 16 illustrates the rms noise at 120 m.

A test instrument as mentioned above was set up in an isolated building equipped to transmit the laser beam over a horizontal path to a distant retroreflector mounted on an accurately calibrated translation stage. The first test performed was a measure of the linearity of the instrument as shown in FIG. 16. This test was made at a range of 100 m with an integration time of 1 s per data point. The slope of the response was correct and the standard deviation of a single point was less than 20 µm, an acceptable value. There was no sign of cyclical error that would be expected if there was rf leakage at the transmitter frequency into the receiver circuits.

Of concern is the effect of atmospheric turbulence on the stability of the range measurement. Turbulence consists of "bubbles" or "blobs" of air at slightly differing density to the surrounding air and is characterized by the so-called structure function $C_n^2$, which may be considered a measure of the refractive-index difference between the "blobs" and the surrounding air. Various references exist relating the structure function $C_n^2$ to variance in range measurement. A large body of references also exists on the characteristics of $C_n^2$.

Figure 15:
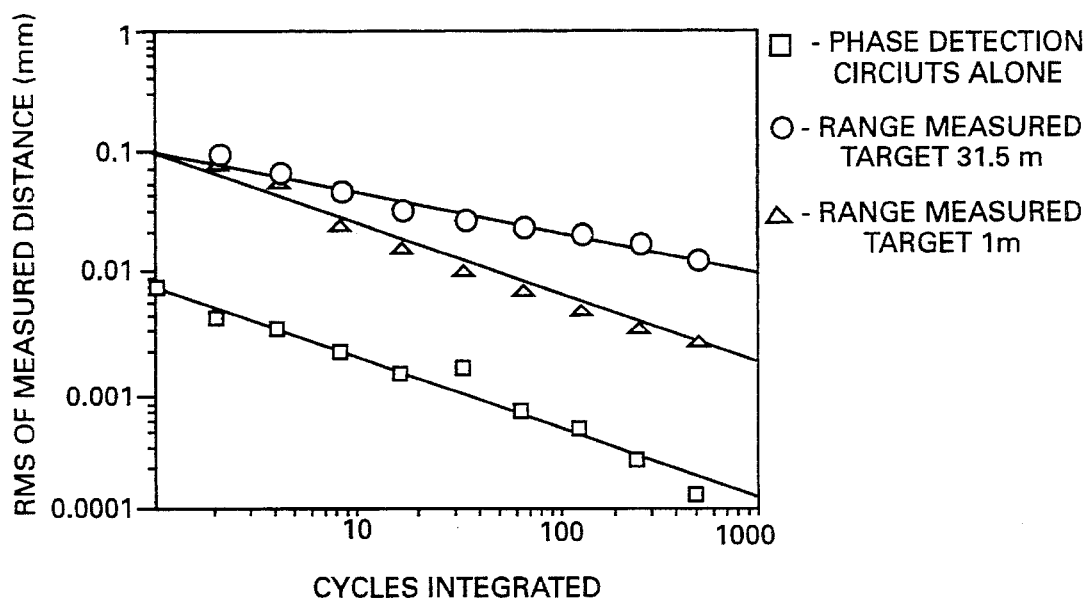
FIG. 15 is a chart illustrating noise contributions to measured distance values.

Prior to investigating the noise introduced by atmospheric turbulence, the instrument noise was investigated with results that are summarized in FIG. 15, a plot of the standard deviation (rms) on a range reading plotted against the number of intermediate frequency (IF) cycles per reading. The IF is 1 kHz; thus, ten IF cycles is an integration time of 10 ms. The noise introduced by the data-taking circuitry, the lowermost curve, is seen to be small, around 0.7 μm for 128 cycles. The noise decreases as the square root of the integration time, as would be expected for random noise. A similar result is observed for measuring a short (1 m) range, the intermediate curve, but in this case the noise is higher, around 6 μm for 128 ms.

The source of this noise is believed to be phase noise on both the transmitter and local oscillator sources. This could be reduced, either by increasing the 1 kHz IF frequency or by increasing the spectral purity of the oscillators, but this performance is considered acceptable for the present implementation. The uppermost curve shows a corresponding plot for a range of about 31.5 m. In this case, atmospheric turbulence causes the phase fluctuations to decrease more slowly with integration time, $t^{-0.3}$ instead of $t^{-0.5}$ due to the Kolmorogorov spectrum of phase variation with time for path lengths greater than the size of the turbulence cells.

The test instrument was then set up to measure to a retroreflector at a range of 120 m. Measurements were taken once per second with an integration time of 128 ms. Each minute the mean and rms of the 60 measured ranges were calculated and stored. The values obtained for the rms departures from the mean were then plotted as shown in FIG. 16. In this example, the rms values cluster around 20 μm, with no values over 50 μm. Over tests continued for several months, rms values varied from 9 to 45 μm. It was noted that the lowest values occurred early on still, foggy mornings and generally the higher values on sunny afternoon s.

There thus has been shown an improved electronic distance measuring apparatus employing a steerable mirror in a preferable laser beam rangefinder system. High accuracies to within 50 μm is provided over a measuring range of about 120 m. By using a plurality of such apparatuses, surveying techniques not heretofore possible can be provided including providing trilateration computation for determining the coordinates of a point in space. This is useful not only for a radio telescope as described herein but for a wide variety of surveying conditions and needs.

It will occur to one of ordinary skill that various modifications may be made to the disclosed embodiment within the scope of the appended claims.

What is claimed is:

1. An electronic optical distance measuring apparatus comprising:

a plurality of targets mounted on a support frame, said support frame being mounted to ground;

three rangefinders arranged in a triangle and mounted on said support frame for measuring distance between said rangefinders and each of said targets, each of said rangefinders including:

means for generating a modulated optical signal at a given modulation frequency;

means for automatically successively transmitting the optical signal from a reference location to said plurality of targets each of which reflects the received transmitted signal;

means for receiving the successively reflected signals from each of said targets at said reference location and for detecting the received signals wherein the detected signals each have a phase difference with the transmitted signal manifesting the distance between the target corresponding to that detected signal and the reference location;

means for determining the phase difference between said detected signals and said transmitted signal and generating a phase difference signal for each said detected signals; and means responsive to each of said phase difference signals for automatically determining the distance from said reference location to each said targets from said determined phase difference; and at least two of said rangefinders also being aimable at each of the other rangefinders for measuring respective distances between all said rangefinders to measure said triangle thereof; and a central computer for controlling said rangefinders and effective for computing by trilateration coordinates of each of said targets based on said measured distances between said rangefinders and said targets, and based also upon coordinates of each of said rangefinders to a reference point relative to said ground.

2. The apparatus of claim 1 wherein said means for transmitting includes movable mirror means including control means for automatically directing said transmitted signal to each said plurality of targets by way of said mirrors.

3. The apparatus of claim 1 wherein said means for determining phase difference includes means for measuring phase difference from a zero point, said zero point tending to exhibit drift causing error in said determined distance, said means for transmitting including means for transmitting the optical signal to a first reference target for generating a reflected reference distance signal and means responsive to said reference distance signal applied thereto for periodically correcting for said periodic drift.

4. The apparatus of claim 3 wherein said means for determining the distance includes means responsive to the determined phase difference of said reference distance signal and said optical signal for correcting the determined distance to each said targets.

5. The apparatus of claim 2 wherein said mirror means includes a mirror, means for rotating the mirror about two orthogonal axes, means for generating a position signal manifesting the position of the mirror about said two axes, said control means including means responsive to said position signal for generating a control input signal to said means for rotating for positioning the mirror to aim the transmitted optical signal at each said plurality of targets.

6. The apparatus of claim 5 wherein the control means includes means for rotating the mirror to a next selected target of said plurality of targets during said determining said distance from a prior selected target.

7. The apparatus of claim 6 wherein said control means stops the rotation of said mirror at a selected target prior to moving the mirror to the next target.

8. The apparatus of claim I wherein said detected signals periodically exhibit errors due to atmospheric variations through which said optical signal 5propagates, said apparatus including a second target located to provide a reference signal manifesting said atmospheric variations, said apparatus including means for periodically transmitting said optical signal to said second target, said means for determining including means for correcting for said atmospheric variations in said determined distance.

9. The apparatus of claim 3 wherein said detected signals periodically exhibit errors due to atmospheric variations through which said optical signal propagates, said apparatus including a second target located to provide a reference signal manifesting said atmospheric variations, said apparatus including means for periodically transmitting said optical signal to said second target, said means for determining including means for correcting for said atmospheric variations in said determined distance.

10. The apparatus of claim 1 wherein the means for transmitting the optical signal includes a displacable mirror and control means for selectively displacing the mirror to transmit the optical signal to each said target in a given sequence, said mirror for receiving the reflected signal.

11. The apparatus of claim 1 wherein said means for determining distance includes means for compensating for atmospheric temperature variations by acoustic thermometry.

12. The apparatus of claim 1 wherein said means for determining phase difference includes means for generating n clock signals in a first cycle, means for producing an intermediate reference (IF) signal, means responsive to an enable input signal for generating a trigger signal every m first cycles defining a second cycle, means for mixing the received detected signal with said IF signal to produce a detected IF signal, and means responsive to said trigger signal, to said detected IF signal and to said n clock signals for generating n samples of said detected IF signal, anti means responsive to said generated n samples in said m cycles for producing said determined distance.

13. The apparatus of claim 12 wherein the targets each comprise a retroreflector, the generated n samples comprises a sequence of samples $s_j$, and the Fourier components of the fundamental harmonic for a retroreflector i are:

$$a_i = \sum_{j=0}^{mn-1} S_j \cos\left(\frac{2\Pi j}{n}\right),$$

$$b_i = \sum_{j=0}^{mn-1} S_j \sin\left(\frac{2\Pi j}{n}\right),$$

where m=number of cycles sampled and the detected IF signal amplitude and phase are:

$$A_i = \frac{2}{mn} (a_i^2 + b_i^2)^{1/2},$$

$$\phi_i = \tan^{-1}\left(\frac{b_i}{a_i}\right).$$

14. The apparatus of claim 13 wherein n is >25 and m is >10.

15. The apparatus of claim 13 wherein the modulation frequency is >1 GHz.

16. An electronic optical distance measuring apparatus for automatically measuring distances to a plurality of targets comprising:
   a plurality of retroreflector targets mounted on a support frame, said support frame being mounted to ground;
   three rangefinders arranged in a triangle and mounted said support frame for measuring distance between said rangefinders and each of said targets, each of said rangefinders including:
      means for generating a modulated infrared signal at a given modulation frequency;
      means for automatically successively transmitting in a given sequence the optical signal from a reference location to each of said plurality of retroreflector targets each of which reflects the received transmitted signal to the reference location;
      means including a mirror at the reference location having automatically controlled different switched positions for receiving the reflected signals from each said plurality of targets at said reference location in accordance with the switched mirror position and means for detecting the received signals wherein the detected signals each have a phase difference with the transmitted signal manifesting the distance between the target corresponding to that detected signal and the reference location;
      means for determining the phase difference between each said detected signals and said transmitted signal and for generating a phase difference signal for each said detected signals;
      means responsive to said generated phase difference signals for determining the distance from said reference location to each said targets from said determined phase differences; and
      means for correcting said phase difference signals for errors; and
   at least two of said rangefinders also being aimable at each of the other rangefinders for measuring respective distances between all said rangefinders to measure said triangle thereof; and
   a central computer for controlling said rangefinders and effective for computing by trilateration coordinates of each of said targets based on said measured distances between said rangefinders and said targets, and based also upon coordinates of each of said rangefinders to a reference point relative to said ground.

17. The apparatus of claim 16 wherein said means for correcting the phase difference signals includes means for automatically periodically correcting said phase difference.

18. The apparatus of claim 17 including a reference retroreflector positioned at a first fixed reference distance value from said reference location, said means for correcting including determining said fixed reference distance with said means for determining the distance and comparison means for comparing the resulting determined fixed distance value with the actual distance value to said reference retroreflector and means responsive to the compared values for determining the error therebetween.

19. The apparatus of claim 16 further including means for correcting said detected received signals i:or atmospheric caused deviations in said detected received signals.

20. The apparatus of claim 19 wherein said means for correcting for atmospheric caused deviations includes a reference retroreflector spaced in ambient atmosphere from said reference location a distance value comparable approximately to at least the distance value to be determined in said ambient atmosphere, said means for determining the distance including comparison means for comparing the resulting determined distance value with the actual distance value to said reference retroreflector and means responsive to the compared values for determining the error therebetween.

21. The apparatus of claim 16 wherein said plurality of targets define a surface of revolution.

22. The apparatus of claim 21 wherein the surface of revolution is a three dimensional parabolic surface, and said targets being located in an array at the surface of said parabolic surface.

23. The apparatus of claim 21 including means at the focus of said parabolic surface for receiving radio waves incident on said parabolic surface.

24. An electronic optical distance measuring apparatus comprising:
   means for generating a modulated infrared (IR) signal at a given modulation frequency;

a plurality of retroreflector targets mounted on a support frame, said support frame being mounted to ground;

three rangefinders arranged in a triangle and mounted on said support frame for measuring distance between said rangefinders and each of said targets, each of said rangefinders including:

means for automatically and successively transmitting the signal from a reference location to said plurality of retroreflector targets each of which reflects the received transmitted signal to the reference location;

said means for transmitting including a movable mirror for directing said IR signal successively to each of said targets and for receiving the successively reflected signals at said reference location;

means for detecting the received signals wherein the detected signals each have a phase difference relative to the transmitted signal manifesting the distance between the target corresponding to that detected signal and the reference location;

means for generating a reference intermediate frequency (IF) signal at a frequency substantially less than the given frequency;

means for reducing the frequency of said detected received signals to said IF frequency to produce an IF detected signal;

means for determining the phase difference between each said IF detected signals and said reference IF signal and for generating a phase difference signal manifesting those differences;

means responsive to each said phase difference signals for automatically determining the distance from said reference location to each said targets from said determined phase differences, said determined distance having a value tending to include errors; and means including a reference retroreflector in the ambient atmosphere responsive to said transmitted signal for generating a reference distance signal and means responsive to said generated reference distance signal for correcting said determined distance errors; and at least two of said rangefinders also being aimable at each of the other rangefinders for measuring respective distances between all said rangefinders to measure said triangle thereof; and a central computer for controlling said rangefinders and effective for computing by trilateration coordinates of each of said targets based on said measured distances between said rangefinders and said targets, and based also upon coordinates of each of said rangefinders to a reference point relative to said ground, and said central computer also being effective for adjusting coordinates of said targets to predetermined positions.

25. The apparatus of claim 24 wherein said means for determining phase difference includes means for determining phase from a zero reference, said errors being due to drift of the zero reference, said reference retroreflector being located for providing a distance value sufficient to provide said reference distance signal.

26. The apparatus of claim 24 wherein said plurality of retroreflector targets are located in a variable ambient atmosphere such as to be subject to refractive index errors caused by such atmospheric variables, said reference retroreflector being located for providing a distance value sufficient to provide said reference distance signal, said means for correcting including means for correcting for said refractive index errors.

27. The apparatus of claim 24 wherein said rangefinders have reference locations defining a plane, and further including means for aiming the IR signal from each said rangefinder at the same retroreflector target in a given sequence and means for determining the distance to the same target from each said rangefinder reference location.

28. The apparatus of claim 27 including a local computer for controlling said mirror and for determining said distances to said same target and said central computer is responsive to said determined distances for performing said trilateration computation on said determined distances from each said plurality of rangefinders for each said targets.

29. The apparatus of claim 24 including means for displacing the mirror to a position to transmit and receive said IR signal from a given target in a first period, said means for determining the distance including means for determining said distance from a prior received reflected IR signal in a second period after said mirror has reached said position.

30. The apparatus of claim 29 including means for displacing and determining said distance in said first and second periods in a plurality of periods per second.

31. The apparatus of claim 25 wherein said means for providing said reference signal provides said reference signal at about twice per minute.

32. The apparatus of claim 26 wherein said means for providing said reference distance signal provides said reference distance signal at about once a minute.

* * * * *